(12) United States Patent
Engle

(10) Patent No.: US 7,232,282 B2
(45) Date of Patent: Jun. 19, 2007

(54) APPARATUS FOR ATTACHING SEMI-TRAILERS TO RAILCARS

(75) Inventor: Thomas Engle, Clayton, NY (US)

(73) Assignee: Wabtec Holding Corp., Wilmerding, PA (US)

( * ) Notice: Subject to any disclaimer, the term of this patent is extended or adjusted under 35 U.S.C. 154(b) by 105 days.

(21) Appl. No.: 11/064,915

(22) Filed: Feb. 24, 2005

(65) Prior Publication Data

US 2005/0191147 A1 Sep. 1, 2005

Related U.S. Application Data

(60) Provisional application No. 60/548,446, filed on Feb. 27, 2004.

(51) Int. Cl.
*B60P 7/08* (2006.01)

(52) U.S. Cl. .............................. 410/59; 410/58; 410/63; 410/64

(58) Field of Classification Search ............ 410/58–64; 105/355, 363; 280/433, 434; 248/165, 421, 248/434, 439, 145.6
See application file for complete search history.

(56) References Cited

U.S. PATENT DOCUMENTS

| | | | |
|---|---|---|---|
| 3,185,421 A | * | 5/1965 | Ferris ........................... 410/59 |
| 4,002,316 A | | 1/1977 | Parchmont |
| 4,074,633 A | | 2/1978 | Hicks, Jr. et al. |
| 4,216,726 A | | 8/1980 | Stoller et al. |
| 4,230,430 A | | 10/1980 | Stoller et al. |
| 4,239,429 A | | 12/1980 | Stoller et al. |
| 4,397,594 A | | 8/1983 | Hammonds et al. |
| 4,400,121 A | | 8/1983 | Krull et al. |
| 4,407,617 A | | 10/1983 | Hammonds et al. |
| 4,557,647 A | | 12/1985 | Hesch et al. |
| 4,723,879 A | | 2/1988 | Holt |
| 5,015,131 A | | 5/1991 | Schmidt et al. |
| 5,026,229 A | | 6/1991 | Matyas et al. |
| 5,029,072 A | | 7/1991 | Moyer et al. |
| 5,054,804 A | | 10/1991 | Stewart |
| 5,112,172 A | | 5/1992 | Engle |
| 5,625,335 A | | 4/1997 | Kelly |
| 5,630,605 A | | 5/1997 | Smallwood |
| 5,715,917 A | | 2/1998 | Smallwood |
| 6,835,035 B1 | | 12/2004 | Hanninen et al. |

* cited by examiner

*Primary Examiner*—Stephen Gordon
(74) *Attorney, Agent, or Firm*—Buchanan Ingersoll & Rooney PC

(57) ABSTRACT

An improvement to a collapsible stanchion on a railcar for supporting semi-trailers thereon. The improvement consists of a linkage which is activated by the pulling of a handle away from the stanchion during the operation of raising it from a resting position to an upright position. The linkage exerts a force on a diagonal support member of the stanchion to urge it into a position where the stanchion's locking mechanism may be engaged to lock the stanchion in an upright position.

21 Claims, 15 Drawing Sheets

For the large triangle by proportionality -
.187/49.41 = restoring force/539.3# so
Restoring force = 539.3 × 0.187/49.41
= 2.041#

For the small triangle
Restoring force = 539.3 × 0.187/17.813
= 5.661#

Total restoring force = 2.04 + 5.66 = 7.70#

APPARATUS FOR ATTACHING SEMI-TRAILERS TO RAILCARS

CROSS REFERENCE TO RELATED APPLICATIONS

This application claims the benefit of U.S. Provisional Patent Application Ser. No. 60/548,446, filed Feb. 27, 2004.

BACKGROUND OF THE INVENTION

The intermodal transport of semi-trailers on ocean going barges and flatbed railcars is well known in the prior art. One known method of attaching or "tying down" semi-trailers for transport on railcars utilizes a collapsible stanchion having a "fifth wheel" mounted thereon which mimics the connection point on the rear of a typical on-road tractor. This apparatus operates as illustrated in FIGS. 1 through 3.

FIG. 1 shows stanchion 40 in a collapsed position about to be pulled erect. The erection is accomplished using an operable hook 12 pivotally mounted to the rear of a terminal tractor 10. Tractor 10 is positioned over stanchion 40 and hook 12 is pivoted down into engagement with an opening (not shown) defined in vertical strut 42 of stanchion 40. FIG. 1 shows hook 12 lowered and engaged in the opening.

In FIG. 2, stanchion 40 has been pulled partially erect by the forward motion of tractor 10. The four main parts of stanchion 40 are now exposed. Stanchion 40 is comprised of vertical strut 42, which will bear the weight of semi trailer 8 when erect; diagonal strut lower portion 46, which is fixed to railcar deck 18 by a pinned connection; a shorter diagonal strut upper portion 44, which is pivotally mounted to both vertical strut 42 and diagonal strut lower portion 46; and top plate 48, which will bear the weight of semi trailer 8 and lock onto the kingpin of trailer 8 to keep trailer 8 and railcar 18 together during travel over the railway.

FIG. 3 shows stanchion 40 in its fully erect position. Stanchion 40 is locked in this position by diagonal strut 45 formed by upper diagonal strut portion 44 and lower diagonal strut portion 46. When fully erect, the joint between upper diagonal strut portion 44 and lower diagonal strut portion 46 is locked against rotation and will remain locked until an abutting plate on terminal tractor 10 is backed against release trigger 14 shown in FIG. 3. Through suitable linkage, the backward motion of tractor 10 against release trigger 14 will unlatch the joint of diagonal strut 45, simultaneously releasing the kingpin and permitting the collapse of stanchion 40 back into the position of FIG. 1.

While the collapsible stanchion as illustrated in FIGS. 1-3 is operable, it suffers from a serious design flaw. To be locked into place, the upper and lower portions 46 and 44 respectively of diagonal strut 45 must be moved slightly beyond their straight line position as defined by the end fastening pins of the two portions 46 and 44, and the center pivot pin all having their centers in one straight line. The reason for this is that a hard stop of high strength is provided to prevent folding of the strut in the wrong direction. By latching the strut slightly over center (i.e., wherein the diagonal strut is beyond its straight line position), any longitudinal compressive force imparted to the diagonal strut by, for example, switching impacts to the car, or slack action when traveling in a train, will force the strut to fold slightly against its hard stop instead of placing the load on the latching mechanism, thereby freeing the latch mechanism from having to bear these very high forces.

Because no amount of statically applied pull on the ends of diagonal strut 45, even up to the breaking strength of diagonal strut 45 could cause this over center alignment to occur, the instructions usually given to operators simply advises that to lock diagonal strut 45 the motion of vertical strut 42 must be rapid enough that diagonal strut 45, because of inertia, will "snap", that is, travel beyond the straight line condition, and lock into place at the over center position.

This is shown in FIG. 4. FIG. 4(a) shows strut 45 before upper portion 44 and lower portion 46 are situated in a straight line. Spring operated latch 50, mounted on upper portion 44, is just touching fixed catch 52, mounted on lower portion 46. FIG. 4(b) shows strut 45 closer to its straight-line position. Note that that the closer strut 45 gets to its straight line position, the lesser is the force exerted to move it further into its straight line position. For example, in the position shown in FIG. 4(b) a tension of 250# will only produce a force of about 23# operating to straighten the strut. FIG. 4(c) shows strut 45 in a completely straight position, but with latch 52 no yet engaged. Finally, FIG. 4(d) shows strut 45 moved past the straight position by approximately 3/16" at 54. At this position, latch 52 is forced into position by springs 51 and stanchion 1 will remain safely erect.

Unfortunately the conditions under which the portion of diagonal strut 46 and 44 will lock into place are seldom, if ever, well defined, and no method exists for assuring the speed necessary to bring about the desired locked up condition. The variables affecting this operation (weather, temperature, cleanliness or lack thereof, lubrication, fit and condition of parts, initial manufacturing tolerances and wear, to name the most obvious) are so varied and variable that the perfect tractor speed on one day might fail the next. Regrettably, the drivers who must load trailers cannot know or control any of the variables except for tractor speed, and in trying to assure lockup of the stanchion, have a tendency to pull harder on stanchion 40 than may be necessary to bring about the locked condition. This can result in failure of the stanchion, and, if the car and the stanchion are made strong enough to resist the resulting forces, damage to the tractor can result. Therefore, it would be desirable to provide an improvement to this design in which the two portions of diagonal strut 45 become locked under conditions that are better defined, can be inspected in service and which do not require the "snapping" of the portions into place.

With the need for high speed pull-ups of the stanchion eliminated from the tractor operating protocol, a maximum speed during pull-up can be imposed (either by the driver or through some form of automatic control) and the hitch and tractor failures mentioned above can be reduced or eliminated.

SUMMARY OF THE INVENTION

The improvement to the prior art stanchion described herein addresses the deficiencies identified above, and provides a system which will assure that when a well-defined and sufficient force is applied to the hook, regardless of speed, the diagonal strut will lock and allow the stanchion to be used in an otherwise normal way. With this end accomplished, a simple tractor control can be implemented which will assure that, when the hook is in the down position and engaged with the stanchion, operating speeds low enough to avoid damage to both the railcar and the tractor are sufficient to engage the stanchion lock.

The improvements described herein are achieved with a modification to the prior art stanchion consisting of the addition of linkages between the vertical strut and upper diagonal strut of the prior art stanchion. The linkages include a handle, located in the same position and having the same profile as the existing opening in the vertical strut. This handle is engaged by the hook on the rear of the terminal tractor, and pivots outwardly from the vertical strut as the tractor moves forward. The pivoting motion of the handle activates a linkage located inside the vertical strut, which moves a lock rod upward. This lock rod in turn is connected to a toggle link near the center thereof. The toggle link is pivoted to the vertical strut at one end while its other end is connected to a second toggle called the input link, which is pivoted to the input lever, which is simply an integral part of the upper diagonal strut portion. Thereby, the upper portion of the diagonal strut is urged into a position wherein the locking mechanism can engage between the upper strut portion and the lower strut portion.

DETAILED DESCRIPTION OF THE INVENTION

Figure 1:
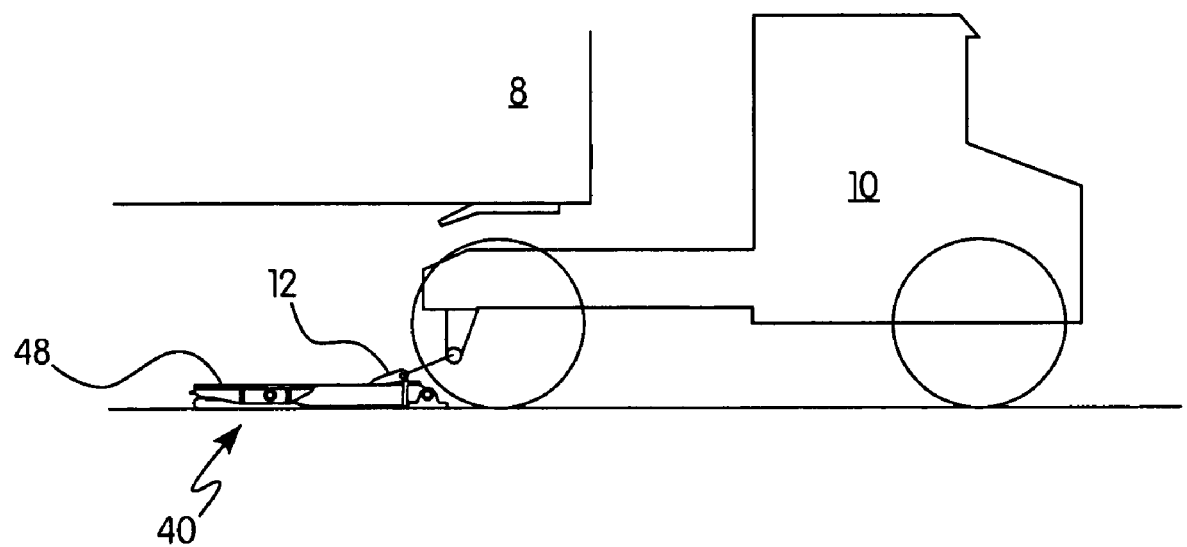
FIG. 1 diagrammatically shows a prior art tractor semi-trailer arrangement utilizing a hook for stanchion pull-up.
Figure 2:
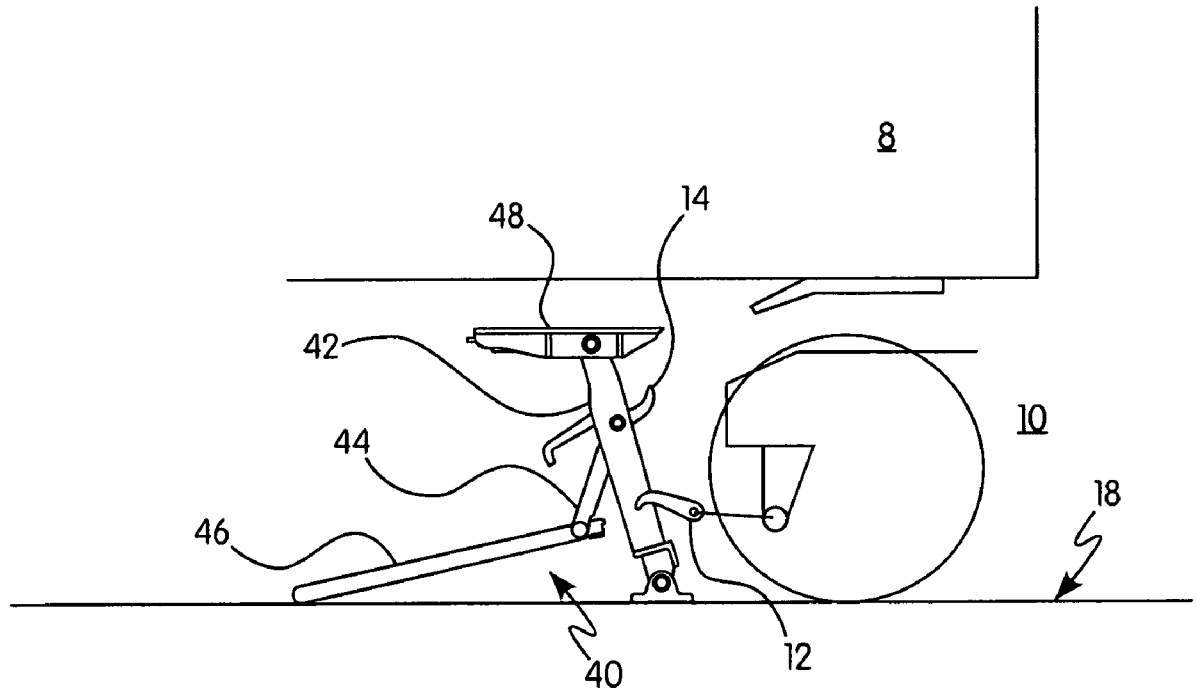
FIG. 2 shows the prior art stanchion of FIG. 1 in a intermediate position.
Figure 3:
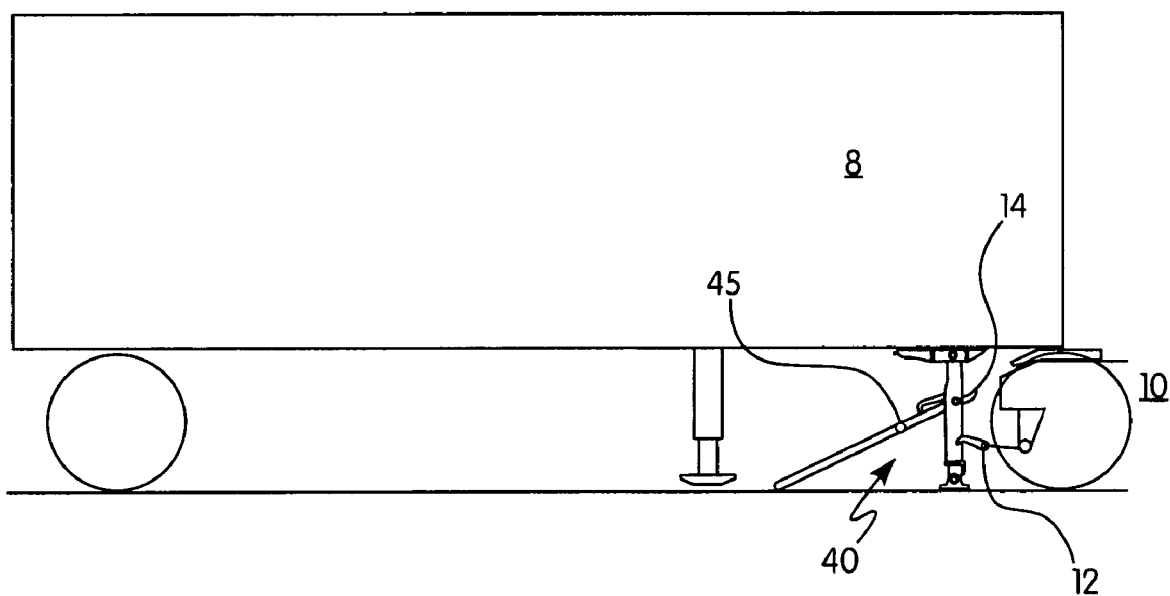
FIG. 3 shows the prior art stanchion of FIG. 1 in the full up and locked position.
Figure 4:
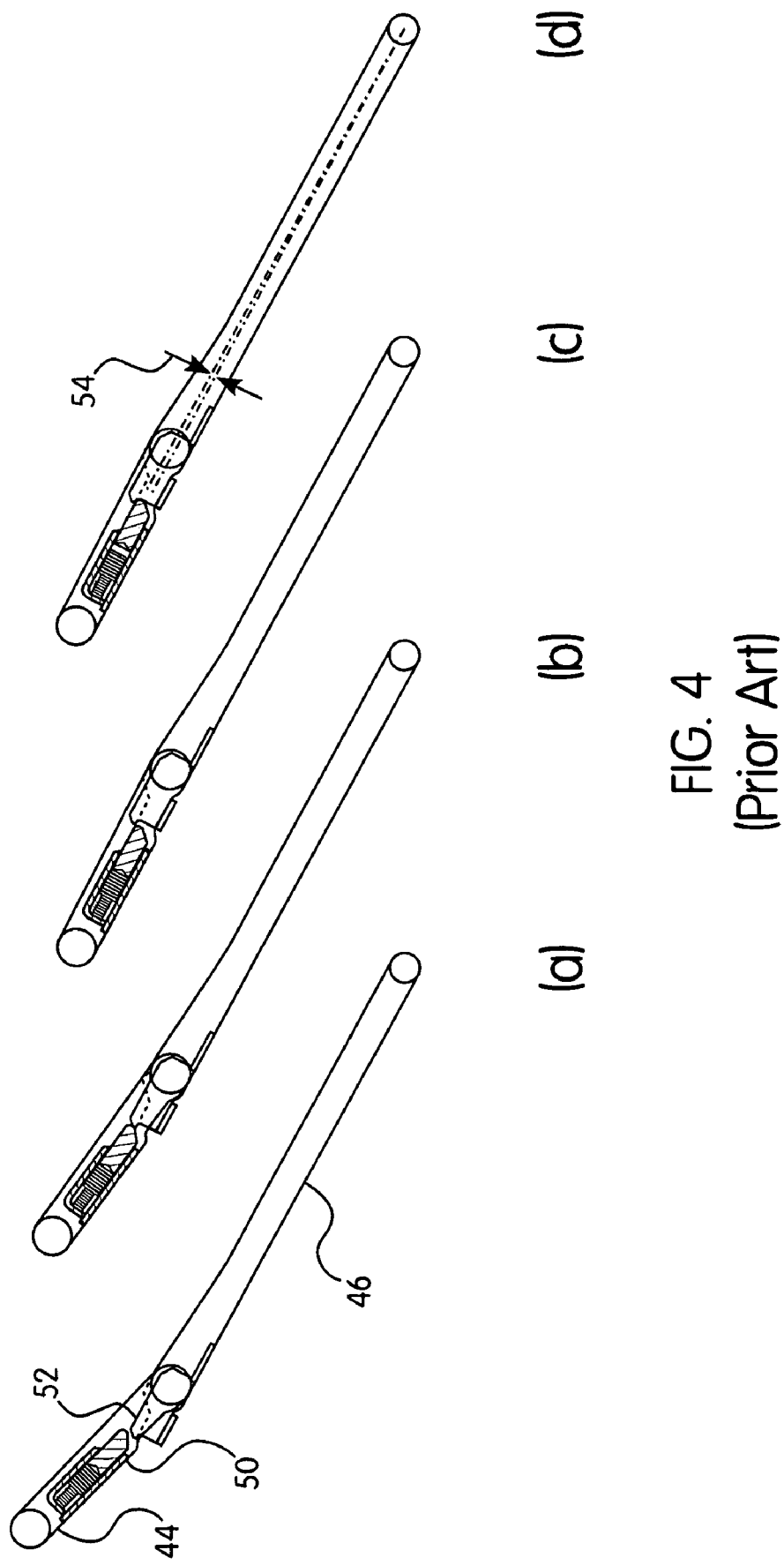
FIGS. 4(a-d) show close up views of the upper and lower portions of a prior art diagonal strut as it is pulled beyond its straight line position and locked into that position.
Figure 5:
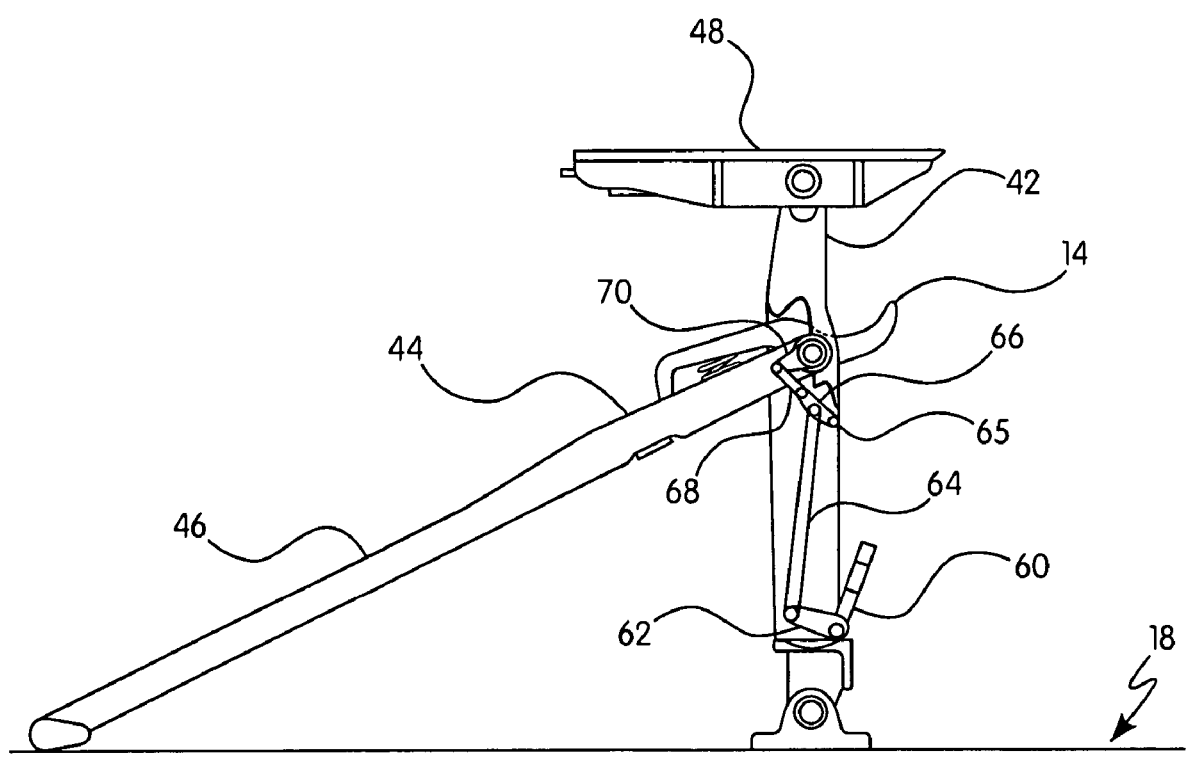
FIG. 5 shows a side view of the preferred embodiment of the invention.

The preferred embodiment of the invention is shown in cross sectional view in FIG. 5 and consists primarily of a linkage added to vertical strut 42 which is engaged when stanchion 1 is raised from the rail deck to its upright and locked position. Handle 60 resides in the area of opening 58 in vertical strut 42 and is engaged by hook 12 positioned on the back of tractor 10, as shown in FIG. 1. The forward motion of tractor 10 causes vertical strut 42 to begin to raise from the deck of the railcar. As vertical strut 42 travels from its collapsed position on deck 18 of the railcar, upper diagonal strut 44 begins to pivot outwardly from vertical strut 42 toward its final latched position as shown in FIG. 5, allowing input lever 70 to rotate about pivot point 71. As a result, handle 60 slowly begins to pivot outwardly away from vertical strut 42. Near the end of the travel of upper diagonal strut 44, further movement of the linkage caused by the continued forward motion of tractor 10, and the force exerted on handle 60 as a result thereof, forces upper diagonal strut 44 beyond a straight line relationship with lower diagonal strut 46, thereby allowing the locking mechanism to engage.

Handle linkage 62 is preferably integral with and perpendicular to handle 60 and moves in unison with the motion of handle 60 as handle 60 pivots away from vertical strut 42. Handle linkage 62 urges lock rod 64 towards the upper end of vertical strut 42. Toggle link 66 is pivotably attached at one end to vertical strut 42. Lock rod 64 engages toggle link 66 in the middle thereof, causing it to rotate about pivot point 65. The other end of toggle link 66 is coupled to input link 68, and the opposite end of input link 68 is coupled with input lever 70. The position of these components in their collapsed position is best shown in FIG. 7.

As lock rod 64 is urged toward top plate 48 by the motion of handle 60 and handle linkage 62, toggle link 66 pivots on pivot point 65 and causes input link 68 to move in a direction designed to urge input lever 70 to rotate about pivot point 71, in the same direction of rotation as upper strut 44. Preferably, pivot point 71 of input lever 70 is coincidental with the point about which upper diagonal strut 44 rotates. Input lever 70 engages upper diagonal strut 44 and urges upper strut 44 to pass beyond a straight line relationship with lower strut 46, thereby allowing the locking mechanism to lock the strut into place in this position. As a result of the assistance provided by the linkage, the engagement of the locking mechanism occurs regardless of the speed at which the apparatus is raised from deck 18 of the railcar.

Figure 6:
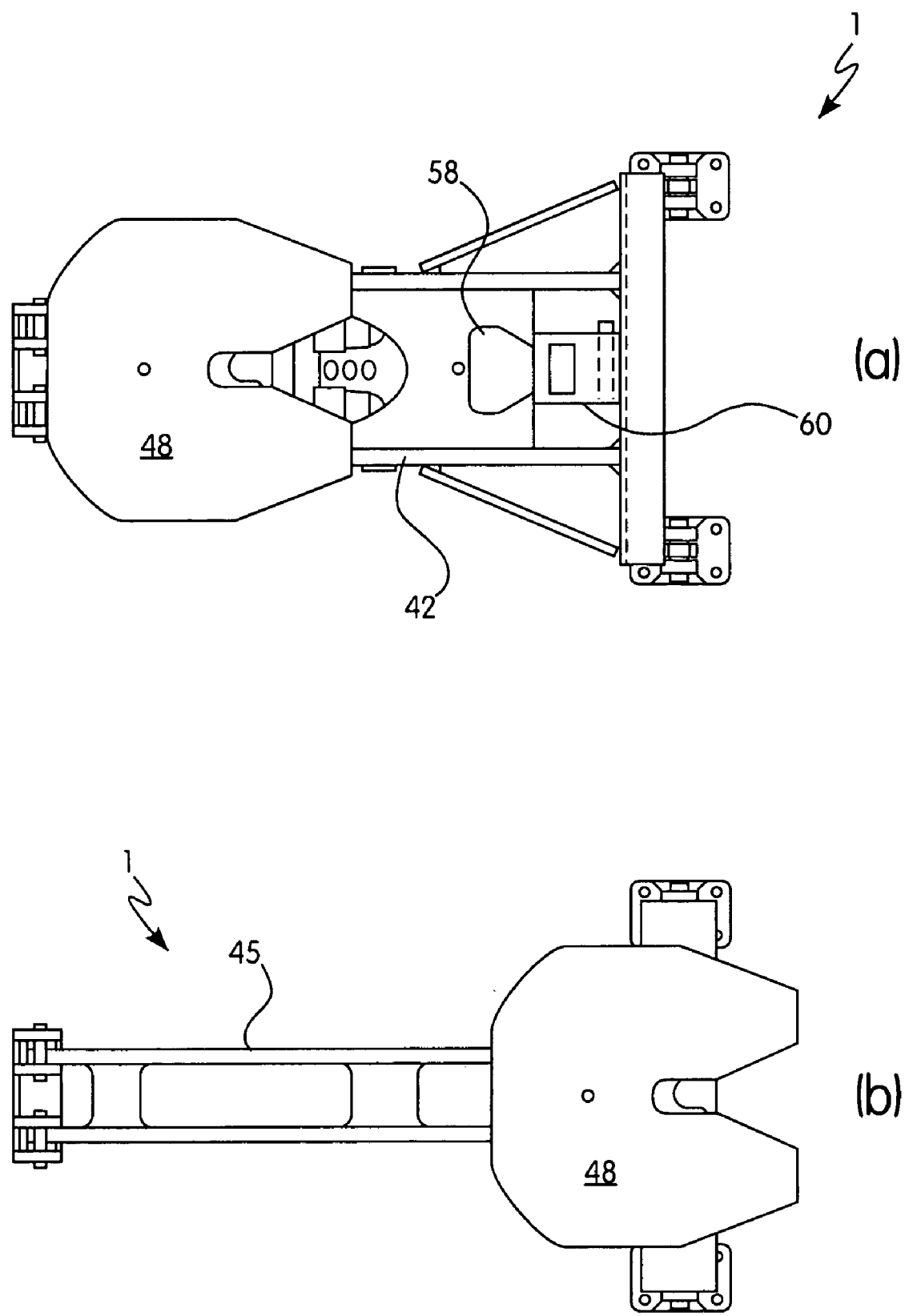
FIGS. 6(a-b) show top views of the stanchion of FIG. 5 in resting position and in up and locked position, respectively.

FIG. 6 shows a top view of stanchion 1 is its resting position in FIG. 6a and in its raised position, in FIG. 6b.

Figure 7:
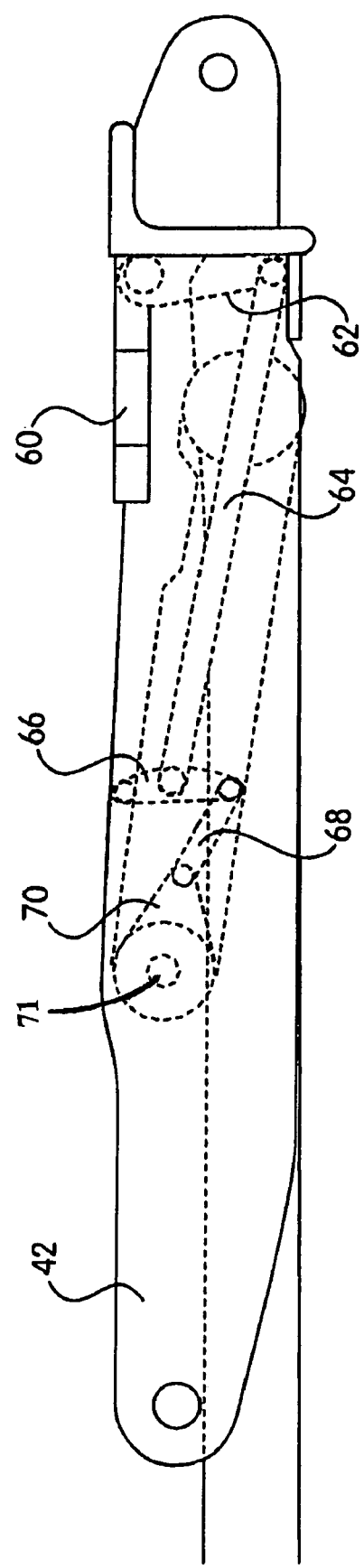
FIG. 7 shows an enlarged view of the stanchion in its resting position.
Figure 8A:
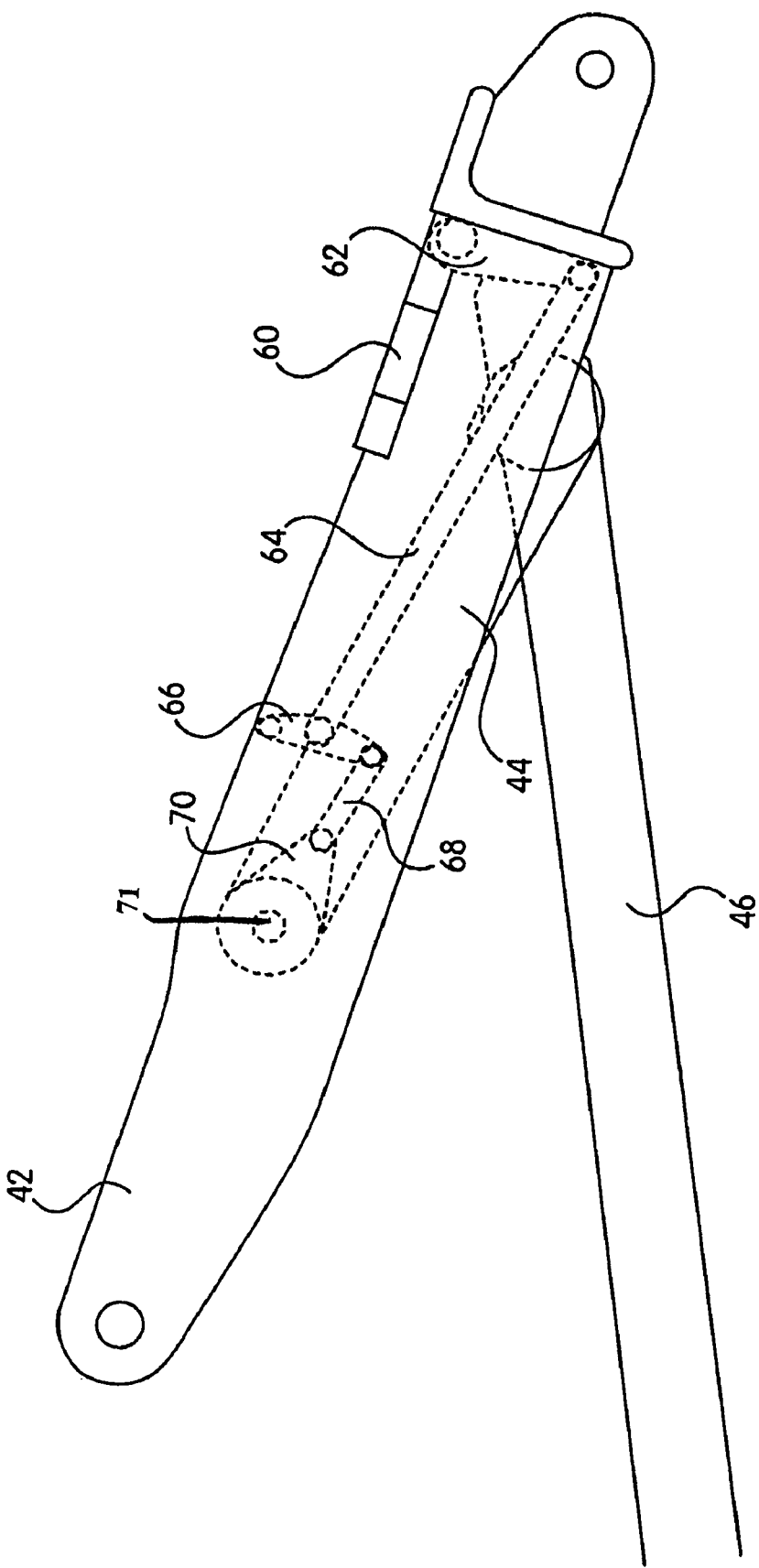
FIGS. 8a and 8b show enlarged views of the stanchion in first and second intermediate positions, respectively.
Figure 8B:
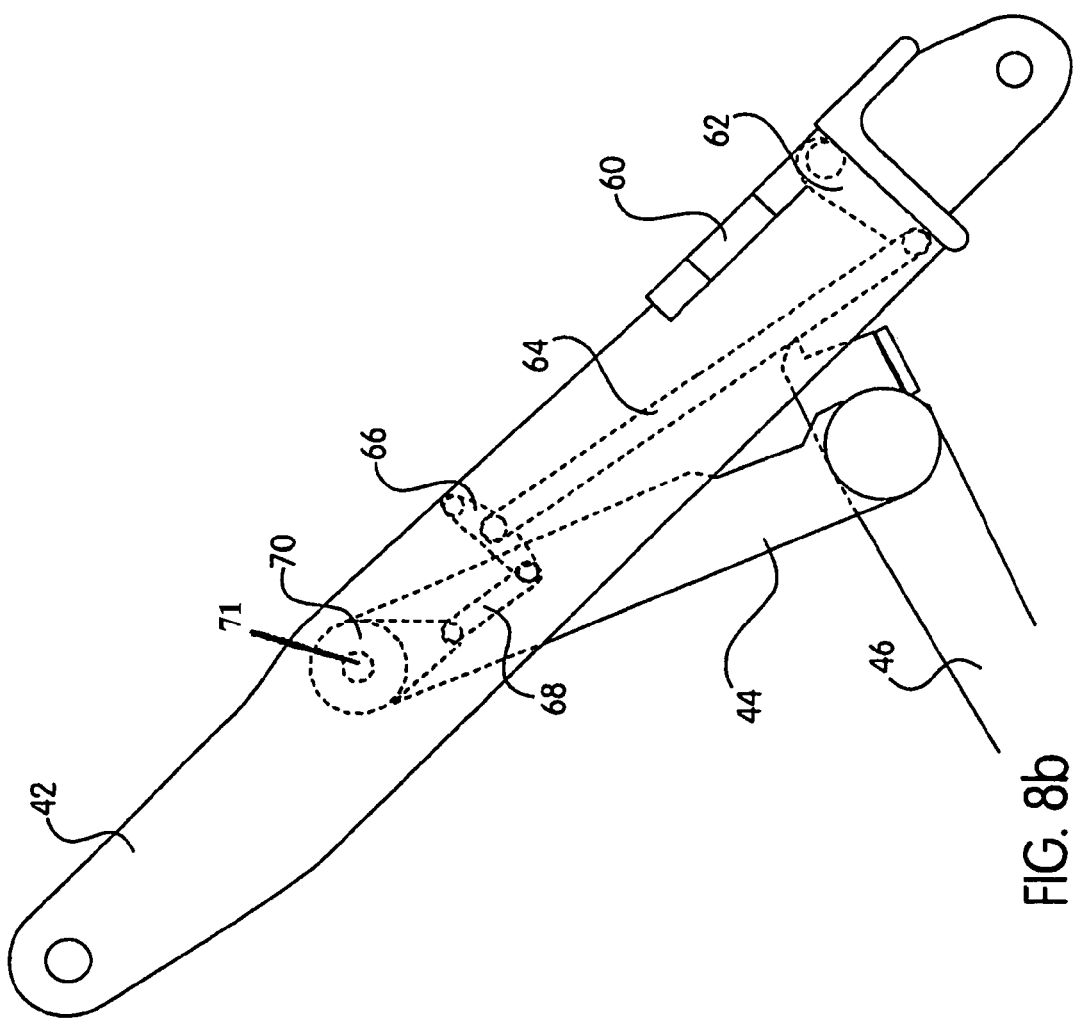
Figure 9A:
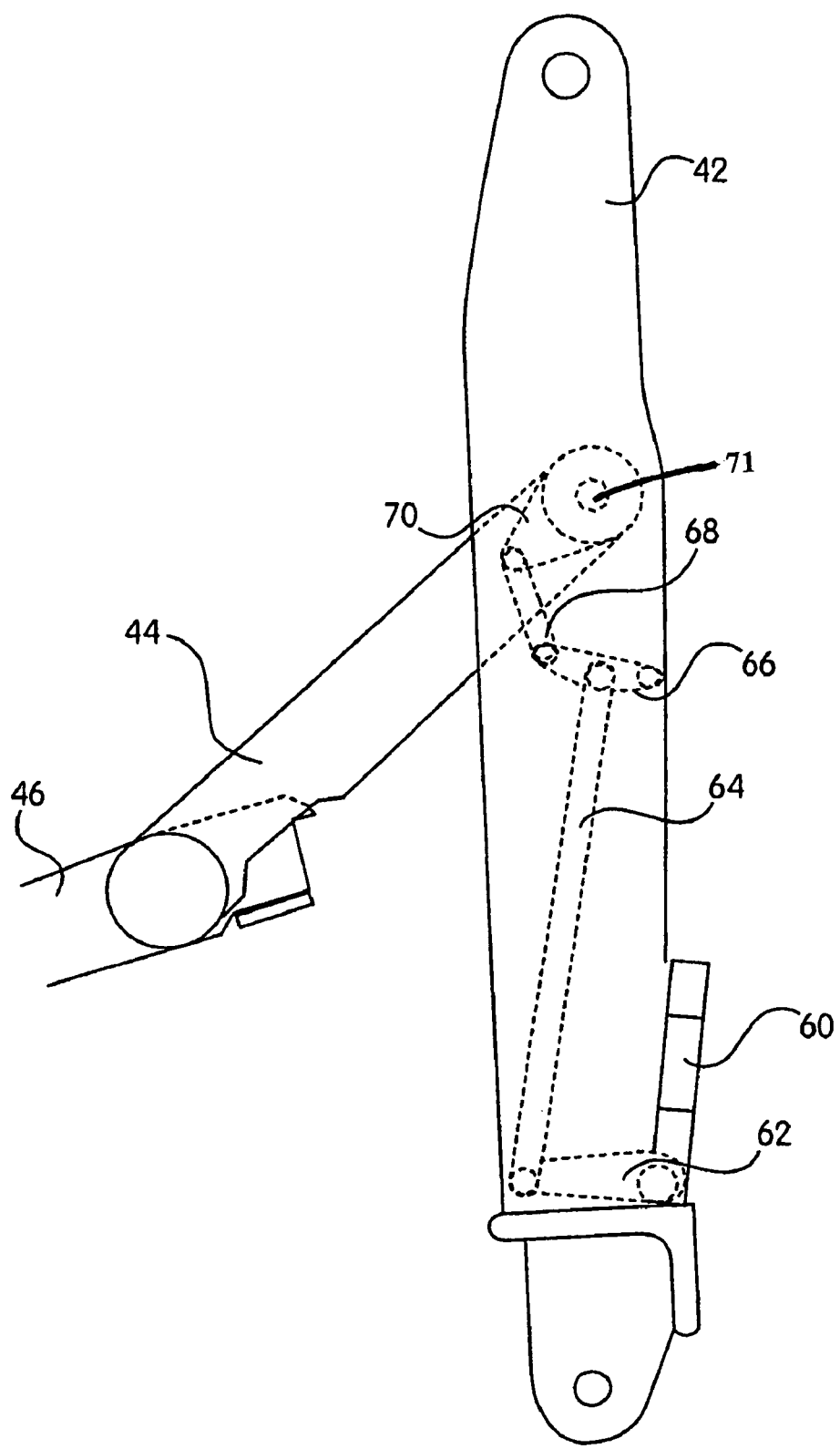
FIGS. 9a and 9b show enlarged views of the stanchion in first and second nearly erect positions, respectively.
Figure 9B:
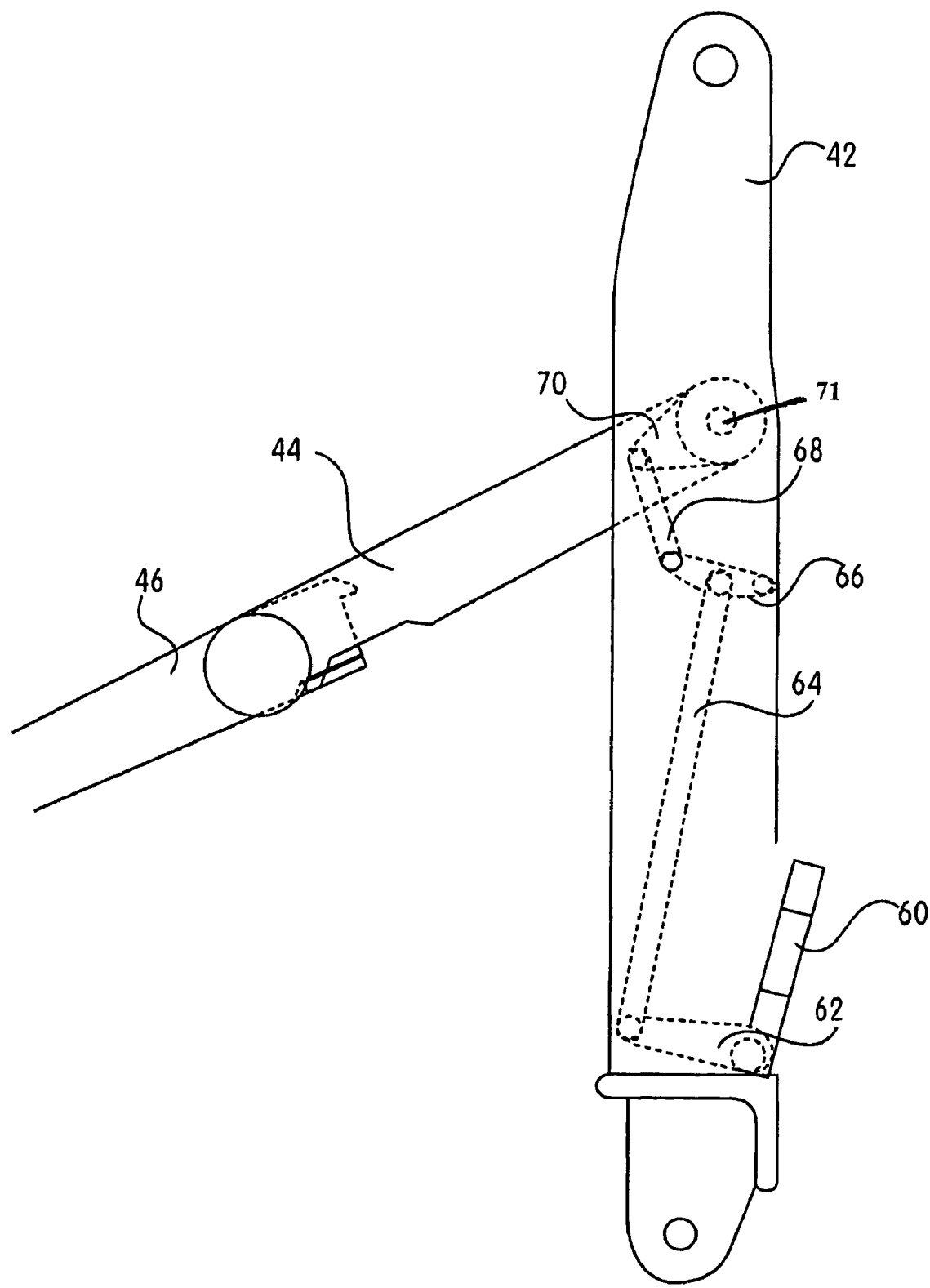

FIG. 7 shows the linkages in their stowed position when stanchion 1 is collapsed on deck 18 of the railcar, showing hook 12 engaging handle 60. FIGS. 8a and 8b show the position of the linkages as the stanchion is being raised off of the railcar deck. Note that hook 12 is still engaging handle 60, however, handle 60 has not yet pivoted in a direction away from vertical strut 42. The movement of handle 60 away from vertical strut 42 is prevented by the position of input lever 70, which cannot rotate because of the position of upper strut 44, which is still folded close to vertical strut 42. In FIGS. 9a and 9b, vertical strut 42 has moved to an almost vertical position and the position of upper diagonal strut 44 allows input lever 70 to rotate in a clockwise direction, further rotation of upper diagonal strut 44 toward its final portion is assisted by the linkage. As handle 60 pivots further away from vertical strut 42, lock rod 64 begins to rotate toggle link about pivot point 65, thereby urging input link 68 in an upward direction and thereby also urging input lever 70 in a clockwise rotation about point 71. This causes the upper portion of upper diagonal portion 44 to also move in a clockwise direction without the need for any type of inertia which would be required absent the new linkage.

Figure 10:
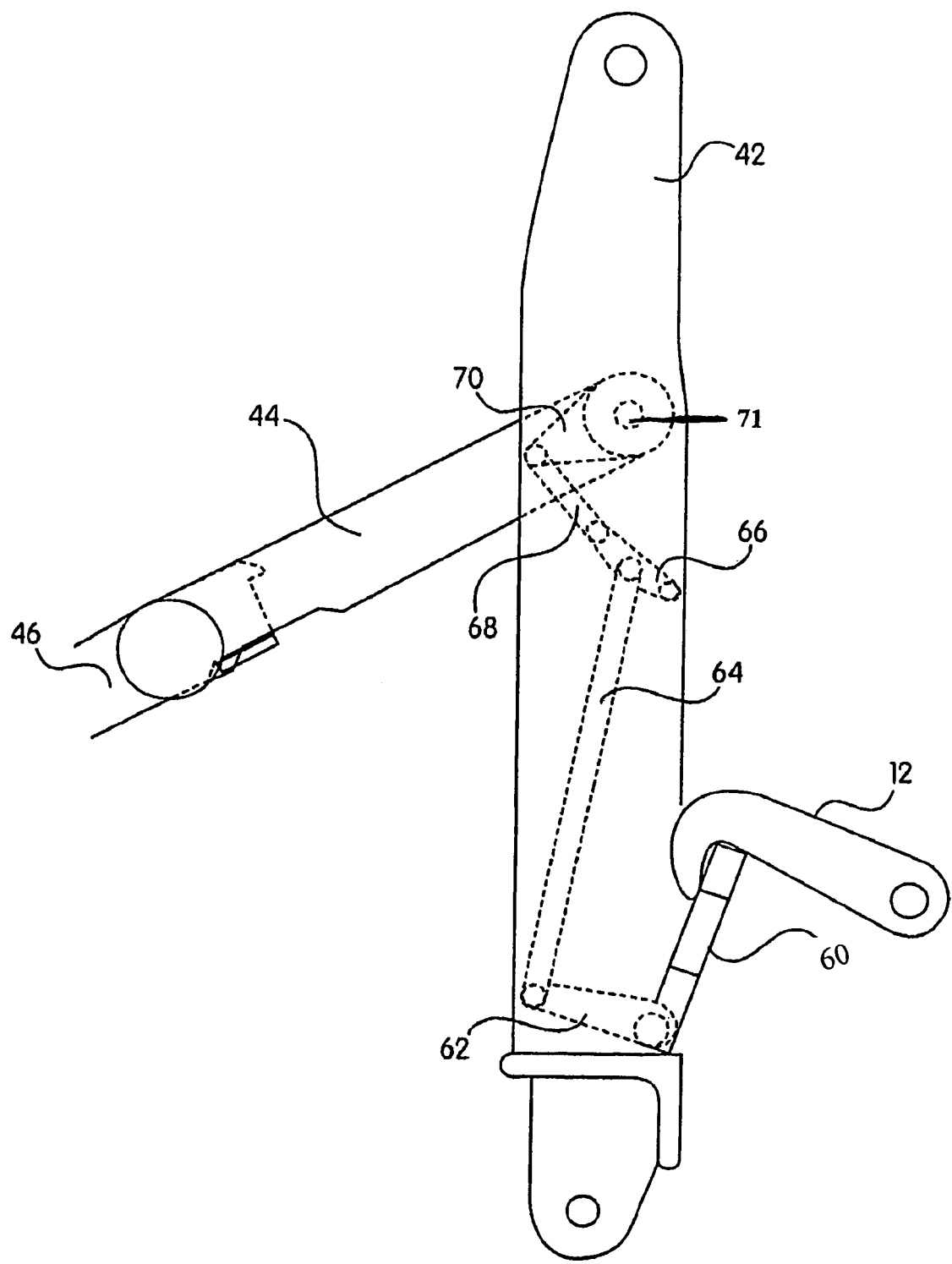
FIG. 10 shows the embodiment of FIG. 5 with the stanchion in a fully erect position.

FIG. 10 shows the stanchion in the complete upright and locked position. After diagonal strut 45 is locked into position, the force on handle 60 may be released and hook 12 removed. This relaxes the linkage comprising lock rod 64, toggle link 62, input link 68 and input lever 70. However, once diagonal strut 45 is locked into place by the engagement of the locking mechanism, the components comprising the linkage are no longer needed to keep the stanchion in the upright and locked position. The only purpose of the linkage is to urge upper diagonal strut 44 into a position where the locking mechanism may engage lower diagonal strut 46 without the need of inertia moving the components past their completely straight positions.

The kinematics of this setup and it's geometry during pull-up operation are illustrated in FIGS. 6, 7, 8a and 9a, along with the forces acting to lift the stanchion and acting on the components of the linkage.

Initial Pull Up Force

This condition is illustrated in FIG. 7. It is assumed for these calculations that a vertical force of 600.5#, applied at the centerline of the kingpin of top plate 48, would raise top plate 48 and attached struts 42 and 45 against both gravity and friction. Therefore, the 600.5 # downward force in the diagram represents the resistance of stanchion 1 to being pulled up at the pivot point of top plate 48. Top plate 48 itself is not shown in FIGS. 7-10, but is represented by the 600.5# weight vector.

The geometry included in FIG. 7 and referenced in the relevant calculation in the Appendix shows that this 600# force will be supplied when a drawbar force along the axis of the connection between hook 12 and tractor 10 is approximately 4000 pounds. This required drawbar force, as shown in the subsequent figures, decreases as the vertical strut rises, becoming essentially zero at the vertical position.

Also shown in the calculations associated with FIGS. 7, 8a, 9a and 10 are the forces in the added linkage acting to open diagonal strut 45 toward its final, over center, locked position. These calculations are to properly size the linkage, and at the end, to assure that the force on upper diagonal strut 44 exerted by linkage will be adequate to assure movement of diagonal strut 45 to its locked position without requiring any potentially damaging dynamic input.

First Intermediate Position

This position is shown in FIG. 8a, which was chosen as the point where significant motion of the toggle links to force the upper diagonal strut outward begins. At this point, the required drawbar (hook) force has dropped to 2124#, both because of the increasing lever arm of hook 12, and the decreasing lever arm of top plate 48. The associated calculation in the Appendix also shows that, at this point, the linkage is exerting a force of only a little more than 1.5# on upper diagonal strut 44, as reflected at that strut's central pin.

Thus, at the position (more or less half elevated) shown in FIG. 8a, the linkage has had almost no influence on the operation of the stanchion.

Second Intermediate Position

In this position, as shown in FIG. 9a, stanchion 1 is nearly erect, and the figure shows that the lever arm through which the 600.5# force is acting is less than one inch. A drawbar force of only 41 pounds is required to balance it but at this point toggle link 66 and input link 68 are beginning to straighten and exert meaningful force on upper diagonal strut 44. This force is calculated in the Appendix as about 5 pounds at the center pin connecting upper and lower diagonal strut halves 44 and 46 respectively.

Diagonal Strut Stretched—Stanchion Erect but Not Locked

The condition, shown in FIG. 10, is the end of travel of vertical strut 42 where the rotation upward of vertical strut 42 has been stopped by the straightening of diagonal strut 45. At this point several important things occur. First, with diagonal strut 45 fully extended, drawbar force is no longer a function of the weight of top plate 48, but acts directly into diagonal strut 45. Thus, any drawbar force that tractor 10 is capable of producing may now be applied to the lever and will cause a proportional reaction force in diagonal strut 45.

Second, while diagonal strut 45 is assumed not to have gone over center due to lack of dynamic input, the linkage at this point is becoming much more capable and is exerting a force to take diagonal strut 45 toward the locked-up position. Because all forces at and beyond this point are proportional to drawbar force, an arbitrarily chosen drawbar force of 1000# is used to determine all the other forces involved in the linkage.

To determine any actual force then, the force shown may be multiplied by the ratio of the actual drawbar force to 1000# and the actual force determined. At a thousand pounds, the axial force in diagonal strut 45 is calculated in the appendix as 539# and the force available to push diagonal strut 45 to lock (at right angles to the axial force) as 260#. To determine whether this force should be adequate, the force opposing it that would obtain at ³⁄₁₆" beyond center was calculated using the geometry of FIG. 11.

Figure 11:
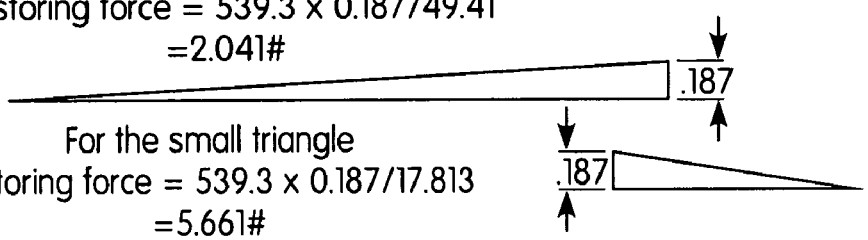
FIG. 11 diagrammatically shows a stanchion with the condition of a diagonal strut over center.
Figure 11:
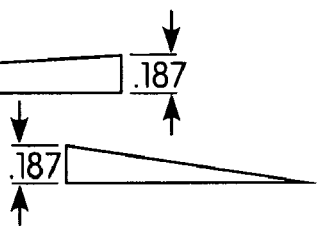
Figure 11:
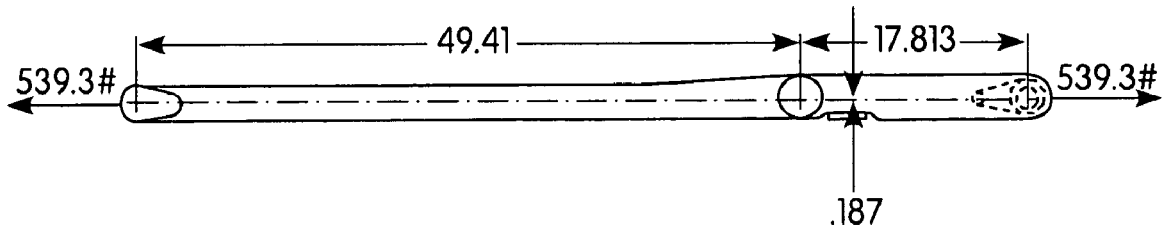

As can be seen from FIG. 11, the force at right angles to the pivot pin of diagonal strut 45, resulting from a thousand pound drawbar pull is only 7.7#, whereas the force available from the linkage to overcome this and move diagonal strut 45 into lock position is about 260#. This will force strut 45 into place and permit the springs in the locking mechanism to move it into engagement.

From the above it should be clear that, because the drawbar force and hence the position of the linkage may be held for as long as desired, a low temperature which might cause the lock latch to move too slowly to dynamically lock up, would not be deleterious to this design. Likewise there is limited potential of someone hitting the linkage so hard that diagonal strut 45 would spring through the position wherein engagement of the locking mechanism could occur and bounce back before the locking mechanism could engage.

Control of the Terminal Tractor

The elimination of the requirement for "snapping up" stanchion 1 allows two important changes to be made in the technology of trailer tie down. One is that the operation of stanchion 1 can be verified with static methods such as using a simple spring scale to verify proper stanchion operation, thus permitting quick inspection and maintenance and adjustment of stanchions to be made at convenient times when trains are not loading or unloading trailers. The other is that the performance of tractor 10 can be repeatably controlled during the erection of stanchion 1 to eliminate excessive forces, thus reducing wear and tear on both railcar and tractor equipment for a significant savings in both loading time and repair costs and delays.

Figure 12:
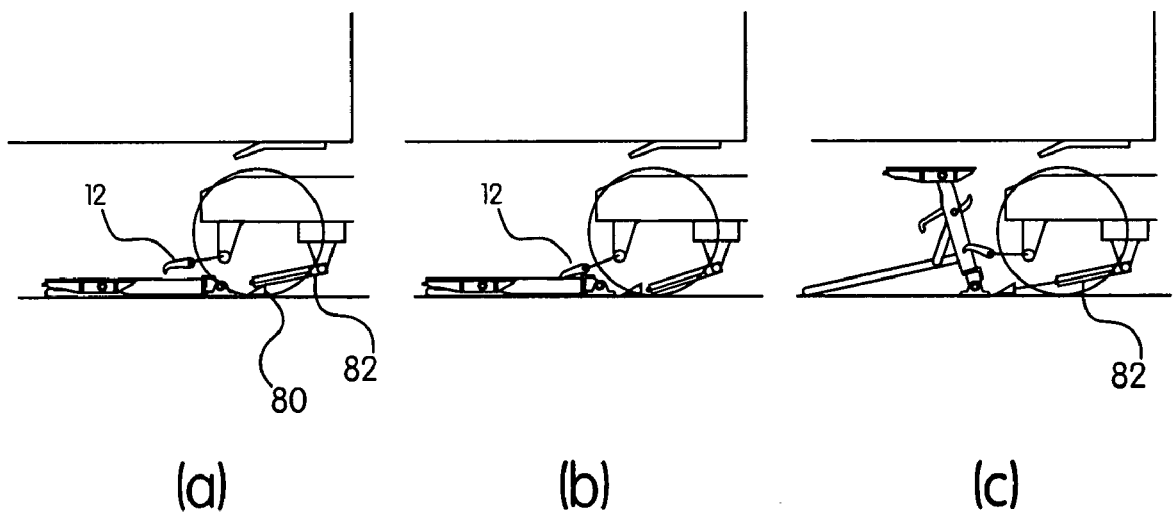
FIGS. 12(a-c) show a hydraulic cylinder control of the tractor for controlled pull-up of the stanchion.

Because the horizontal distance the tractor must travel to erect a stanchion is only about 17½ inches, a stop 80 could be affixed to deck 18 of the railcar at a convenient point at or ahead of the vertical strut mounts and a retracted hydraulic cylinder 82 affixed to the tractor such as shown in FIGS. 12(a-c) could be lowered to the deck at the same time that hook 12 is lowered to acquire stanchion pull-up handle 60. The action of operating the hook control to lower hook 12 and cylinder 82, as shown in FIG. 12(a), could also, through separate controls, restrict the speed of the tractor engine to idle. The position of the stop and the relationship of the cylinder position to the position of the hook could be arranged such that when the tractor moves forward and the hook engages pull-up handle 60, the end of cylinder 82 would move over stop 80 to a position an inch or so ahead of it, as shown in FIG. 12(b). At this point, tractor 10 would stop, because it takes nearly 4000 pounds of drawbar pull to begin to raise stanchion 1 and this force is not available when the engine speed is at idle. At this point, the operator could supply hydraulic cylinder 82 with fluid at a rate to move tractor 10 forward at a rate of approximately 8-16 inches per second, as shown in FIG. 12(c), and reaction force would cause pressure in cylinder 82 to rise and fall in accord with the resistance to motion caused by the varying drawbar force requirement. With the stanchion locked up, the cylinder would not be capable of continuing to move tractor 10 forward, at which point the operator should disengage the hydraulic fluid from the cylinder and raise the hook. This arrangement would provide one simple means of controlling loads and dynamics for the entire erection and lock up operation.

Figure 13:
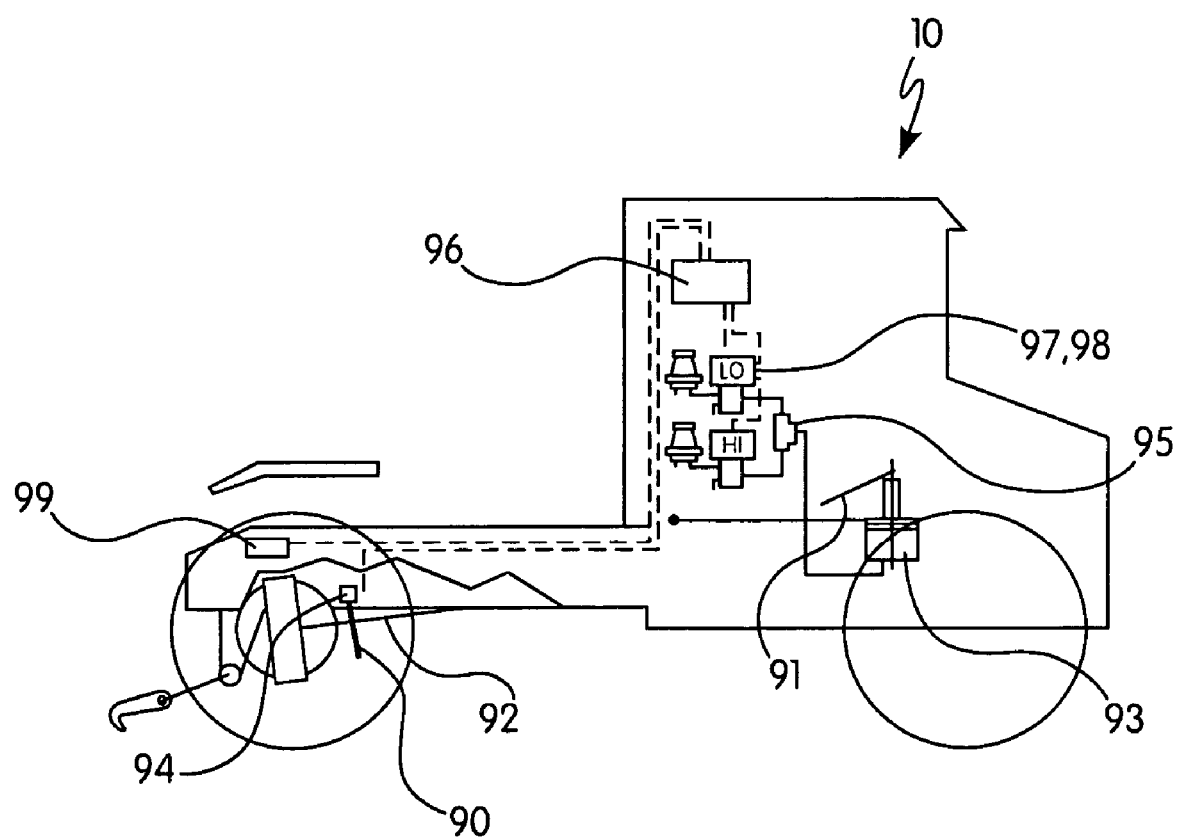
FIG. 13 diagrammatically shows an alternate electro optic speed control for a tractor to allow controlled pull-up of the stanchion.

Alternatively, a perforated or radially slotted disc 90 could be fixed to prop shaft 92 of tractor 10 and the edge of the disc could be straddled by an optical switching unit 94 or photonic detector. The slots would then pass between the source and photodiode of the detector as disc 90 rotated, thus producing an output signal which would switch a definite number times per revolution of shaft 92 no matter how low the shaft speed might be, This detector in turn would signal one input of a programmable logic controller (PLC) 96 to supply power to a first solenoid air valve 97 when the speed of prop shaft 92 corresponded with a tractor speed of approximately 8-12 inches per second, and to supply power to a second such valve 98 as tractor speed got to or above approximately 16-20 inches per second. A second input to PLC 96 would be provided by a hook position indicator 99 and would prevent any signal to the solenoids when hook 12 was retracted, thus preventing interference with normal tractor operation when the hook is in the raise position. A schematic representation of such a system is shown in FIG. 13.

Each of the solenoid valves would supply air via a double check valve 95 to a small actuator 93 on or beneath the cab floor, which would urge the throttle control pedal upward to its idle position. First solenoid 97 would supply air at a low enough pressure that the operator could, by exerting an increase in effort, maintain the throttle open above idle. The second valve 98 would admit air at a higher pressure to actuator 93 and would be more capable of moving pedal 91 back to idle than the operator could be in forcing it down. The operator then, could speed the engine up to provide the increased drawbar pull necessary to start the stanchion up, but would not be able to cause a tractor over speed during the stanchion erection operation. The double check valve 95 would send the higher pressure to actuator 93, and permit its exhaustion when both solenoids 97 and 98 were off.

As has been shown, the invention can be practiced in a number of ways with various loads and forces involved, and is not limited to the linkage shown, which is described merely as an example of one linkage design that satisfies the requirements of the invention. The following example uses some typical forces as one example. It is also to be understood that this example is only one of many load/force embodiments that could be practiced within the scope of the invention claimed, shown, and described herein.

Appendix—Calculations Relative to FIGS. 7-11

Forces Acting on Stanchion and Linkage—FIG. 7

A vertical cylinder 4' diameter with a 1" rod can be attached to top plate 48 at the kingpin centerline, and would raise top plate 48 vertically when pressure exceeding 51 psi was supplied to the cylinder.

Force produced by this cylinder then is found from:

Piston area=0.785*15=11.775 sq in.

Vertical force=11.775*51=600.5 #

Moment required about vertical strut anchor pin then is:

600.5*41.62=24992.81 # in.

Force on hook to provide this moment is: Initial lever arm to hook=6.29 as shown.

Initial Hook force required is: 24992/6.29=3973.2 #

Internal forces on diagonal strut lock assurance linkage torque on input handle to generate internal force=lifting force×handle length:

3973*2.75=10925.75 # in

Force on lock rod=10925.75/3.9=2801.4 #

Force on Upper Diagonal Strut
Compressive force in toggle link

2801*1.53/2.81=1525#

Torque on upper diagonal strut: 1525*0.063=96.0#in (to close)

Resultant force at pin connecting upper and lower diagonal strut:

96/17.81=5.4 # working against strut opening up (negligible)

Ratio Input/output: 3972/-5.4=-735.5

Forces Acting on Stanchion and Linkage—FIG. 8a
Torque required about vertical strut anchor pin 600.4*32.8/9.27=hook force of 2124.39 #

Internal forces on diagonal strut lock assurance linkage:

Force on lock rod=2124*4.02/3.9=2189.8 #

Force on Upper Diagonal Strut
Compressive force in toggle link

2189*1.52/2.95=1128.3 #

Torque on upper diagonal strut: 1128.3*0.02=22.56 # in (to open)

Resultant force at pin connecting upper and lower diagonal strut:

22.56/17.81=1.26 # working to open the strut up (negligible)

Ratio Input/output: 2124.4/1.26=1686.0

Forces Acting on Stanchion and Linkage—FIG. 9a

Hook force is 600.4*0.961/13.777=41.88 #

Internal forces on diagonal strut lock assurance linkage;

Force on lock strut=41.88*7.34/3.93=78.21 #

Force on Upper Diagonal Strut

Force in control link: 41.88*1.653/2.231=31.02 #

Force at pivot pin to lower diagonal strut:
31.02*2.845/17.813=4.954 # to open

Ratio input/output is 41.88/4.954=8.453

Calculations for FIG. 10

Tension force in diagonal strut from 1000# drawbar=1000*13.487/25.007=539.3 #

Force in Lock Strut 539.3*7.033/3.894=974.03 #

Force in control link=974.0*1.565/0.927=1644.3 #

Force at pivot pin to lower diagonal strut 1644.3*2.821/17.813=260.4 # to open

Ratio input/output+1000/260.4=3.840

Calculations for FIG. 11

With diagonal strut under 539.3 # tension and strut control linkage straightened to force the center pin over center by 3/16 in., the proportional triangles of FIG. 10 give the restoring force which must be overcome by the action of the linkage.

For the larger triangle the restoring force is:

539.3*0.187/49.41=2.041 #

For the smaller triangle the restoring force is;

539.3*0.187/17.813=5.661 #

The total restoring force then is:

2.041+5.661=7.702 #

Thus the force available to move the diagonal strut over center against pin friction, latch friction, and latch spring load, so as to allow the latch to engage will be:

260.4−7.7=252.3 # (for each 1000# imposed on the pull-up handle by the drawbar)

What is claimed is:

1. A collapsible stanchion for supporting a semi-trailer during transport on a railcar, said railcar having a deck, comprising:
   a. a vertical strut, said vertical strut being pivotally coupled to said deck of said railcar;
   b. a first diagonal member, said first diagonal member being pivotally coupled to said deck of said railcar;
   c. a second diagonal member, said second diagonal member having a first end and a second end, said first end of said second diagonal member being pivotally coupled to said first diagonal member, said second end of said second diagonal member being pivotally coupled to said vertical strut, wherein said first and said second diagonal members form a single diagonal strut when said stanchion is raised from a resting position on the deck of said railcar to an upright position;
   d. a handle, said handle being pivotally connected to said vertical strut, said handle having a handle linkage attached to said handle;
   e. and a linkage mechanism for urging said second diagonal member into position to form said single diagonal strut, said linkage mechanism being comprised of a lock rod, a toggle link, an input link and an input lever, said lock rod having a first end and a second end, said toggle link having a first end, a second end, and a middle portion between said first and second ends of said toggle link, said input link having a first end and a second end, said input lever having a first end and a second end, said first end of said lock rod being pivotally coupled to said handle linkage, said second end of said lock rod being pivotally coupled to said middle portion of said toggle link, said first end of said toggle link being pivotally coupled to said vertical strut, said second end of said toggle link being pivotally coupled to said first end of said input link, said second end of said input link being pivotally coupled to said first end of said input lever, said second end of said input lever being pivotally coupled to said vertical strut at a pivot point.

2. The stanchion of claim 1 wherein said second diagonal member is at an angle relative to said first diagonal member when said stanchion is in its upright position.

3. The stanchion of claim 1 further comprising a locking mechanism for locking said first and said second diagonal members together.

4. The stanchion of claim 1 wherein said linkage mechanism is activated by pulling said handle.

5. The stanchion of claim 4 wherein pulling said handle also causes said stanchion to be raised from said resting position to said upright position.

6. The stanchion of claim 3, wherein said locking mechanism engages said diagonal strut to lock said first and said second diagonal members together.

7. The stanchion of claim 1 wherein said second end of said second diagonal member is pivotally coupled to said vertical strut at said pivot point.

8. The stanchion of claim 7 wherein pulling said handle causes said lock rod to pivot said toggle link and said input link into a semi-straight relationship with each other, said pivot of said input link causing said input lever to be urged in a rotation about said pivot point and causing said second diagonal member to rotate about said pivot point so that said first end of said second diagonal member rotates away from said vertical strut.

9. The stanchion of claim 8 wherein said linkage mechanism is able to urge said second diagonal member to rotate about said pivot point when further force applied to raise said stanchion to its upright position is unable to cause said second diagonal member to further rotate about said pivot point.

10. The stanchion of claim 3, wherein said locking mechanism engages said first diagonal member to lock said first and said second diagonal members together.

11. The stanchion of claim 3, wherein said locking mechanism is comprised of a spring.

12. The stanchion of claim 1 wherein said handle linkage is integral with said handle.

13. The stanchion of claim 1 wherein said handle linkage is perpendicular to said handle.

14. In a collapsible stanchion on a railcar for supporting a semi-trailer during transport, said stanchion comprising a vertical strut, said vertical strut being pivotally coupled to a deck of said railcar, a first diagonal member, said first diagonal member being pivotally coupled to said deck of said railcar, a second diagonal member, said second diagonal member having a first end and a second end, said first end of said second diagonal member being pivotally coupled to said first diagonal member, said second end of said second diagonal member being pivotally coupled to said vertical strut, wherein said first and said second diagonal members form a single diagonal strut when said stanchion is raised from a resting position on the deck of said railcar to an upright position, a handle, said handle being pivotally connected to said vertical strut, said handle having a handle linkage attached to said handle, and a locking mechanism, said locking mechanism locking said first and said second diagonal members when said first and second diagonal members form said diagonal strut, wherein the improvement comprises:

a linkage mechanism for urging said second diagonal member into position to form said single diagonal strut, said linkage mechanism being comprised of a lock rod, a toggle link, an input link and an input lever, said lock rod having a first end and a second end, said toggle link having a first end a second end and a middle portion between said first and second ends of said toggle link, said input link having a first end and a second end, said input lever having a first end and a second end, said first end of said lock rod being pivotally coupled to said handle linkage, said second end of said lock rod being pivotally coupled to said middle portion of said toggle link, said first end of said toggle link being pivotally coupled to said vertical strut, said second end of said toggle link being pivotally coupled to said first end of said input link, said second end of said input link being pivotally coupled to said first end of said input lever, said second end of said input lever being pivotally coupled to said vertical strut at a pivot point.

15. The collapsible stanchion of claim 14 wherein said linkage mechanism is able to engage said second diagonal member and lock said first and said second diagonal members when said first and second diagonal members form said diagonal strut.

16. The collapsible stanchion of claim 14 wherein said linkage mechanism is activated by pulling said handle.

17. The collapsible stanchion of claim 16 wherein pulling said handle causes said stanchion to be raised from said resting position to said upright position.

18. The collapsible stanchion of claim 14, wherein said second end of said second diagonal member is pivotally coupled to said vertical strut at said pivot point.

19. The collapsible stanchion of claim 18 wherein pulling said handle causes said lock rod to pivot said toggle link and said input link into a semi-straight relationship with each other, said pivot of said input link causing said input lever to be urged in a rotation about said pivot point and causing said second diagonal member to rotate about said pivot point so that said first end of said second diagonal member rotates away from said vertical strut.

20. The collapsible stanchion of claim 19 wherein said linkage mechanism is able to urge said second diagonal member to rotate about said pivot point when further force applied to raise said stanchion to its upright position is unable to cause said second diagonal member to further rotate.

21. The collapsible stanchion of claim 14 wherein said second diagonal member is at an angle relative to said first diagonal member when said stanchion is in its upright position.

\* \* \* \* \*

UNITED STATES PATENT AND TRADEMARK OFFICE
CERTIFICATE OF CORRECTION

| | |
|---|---|
| PATENT NO. | : 7,232,282 B2 |
| APPLICATION NO. | : 11/064915 |
| DATED | : June 19, 2007 |
| INVENTOR(S) | : Thomas Engle |

Page 1 of 1

It is certified that error appears in the above-identified patent and that said Letters Patent is hereby corrected as shown below:

Title Page;
At (56) References Cited, please delete "5,029,072 A  7/1991 Moyer et al." and replace with --5,059,072 A  10/1991 Holt--

Signed and Sealed this

Twenty-fifth Day of December, 2007

JON W. DUDAS
*Director of the United States Patent and Trademark Office*